United States Patent
Maor et al.

(10) Patent No.: US 11,250,342 B2
(45) Date of Patent: Feb. 15, 2022

(54) SYSTEMS AND METHODS FOR SECONDARY KNOWLEDGE UTILIZATION IN MACHINE LEARNING

(71) Applicant: SparkBeyond Ltd., Zikhron-Yaakov (IL)

(72) Inventors: Meir Maor, Netanya (IL); Ron Karidi, Herzliya (IL); Sagie Davidovich, Zikhron-Yaakov (IL); Amir Ronen, Haifa (IL)

(73) Assignee: SparkBeyond Ltd., Natanya (IL)

( * ) Notice: Subject to any disclaimer, the term of this patent is extended or adjusted under 35 U.S.C. 154(b) by 466 days.

(21) Appl. No.: 15/165,015

(22) Filed: May 26, 2016

(65) Prior Publication Data
US 2017/0017899 A1    Jan. 19, 2017

Related U.S. Application Data

(60) Provisional application No. 62/193,196, filed on Jul. 16, 2015, provisional application No. 62/193,199, filed on Jul. 16, 2015.

(51) Int. Cl.
*G06N 20/00* (2019.01)
*G06F 16/28* (2019.01)
*G06F 16/2455* (2019.01)

(52) U.S. Cl.
CPC ......... *G06N 20/00* (2019.01); *G06F 16/2456* (2019.01); *G06F 16/285* (2019.01)

(58) Field of Classification Search
None
See application file for complete search history.

(56) References Cited

U.S. PATENT DOCUMENTS 3,587,054 A * 6/1971 Byrne .................... G01S 13/66
                                                            701/117
6,304,864 B1 * 10/2001 Liddy ................ G06F 16/9535
                                                             706/15

(Continued)

OTHER PUBLICATIONS

Geodesy "Lesson 6: An introduction to pointers" Verified by wayback machine to 2008 [Online] Downloaded Apr. 12, 2019 https://web.archive.org/web/20080307093756/https://www.cprogramming.com/tutorial/lesson6.html (Year: 2008).*

(Continued)

*Primary Examiner* — Ben M Rifkin

(57) ABSTRACT

A classifier is computed as follows. For a first set of values of primary field(s) of primary data instances of a labeled primary training dataset, a second set(s) of secondary fields of unclassified second data instances of secondary dataset(s) is identified. First set of values are matched to corresponding values in respective secondary field(s), and linked to other secondary fields of respective secondary data instance(s) of the respective matched secondary field. A set of classification features is generated. Each including: (i) condition(s), and (ii) a value selected from the linked other secondary fields of the respective secondary data instance(s) of the respective matched secondary field(s). The respective classification feature outputs a binary value computed by the condition(s) that compares between the value selected from the other linked secondary fields and a new received data instance. A classifier is computed according to a selected subset of the classification features.

23 Claims, 5 Drawing Sheets

(56) References Cited

U.S. PATENT DOCUMENTS

| | | | |
|---|---|---|---|
| 6,466,929 B1 | 10/2002 | Brown et al. | |
| 8,856,125 B1* | 10/2014 | Malpani | G06F 17/30861 707/737 |
| 2002/0099519 A1* | 7/2002 | Srivastava | G06N 20/00 702/181 |
| 2004/0220839 A1 | 11/2004 | Bonissone et al. | |
| 2006/0179016 A1 | 8/2006 | Forman et al. | |
| 2007/0217676 A1* | 9/2007 | Grauman | G06K 9/4671 382/170 |
| 2008/0114710 A1* | 5/2008 | Pucher | G06N 99/005 706/20 |
| 2008/0133434 A1 | 6/2008 | Asar et al. | |
| 2008/0183705 A1* | 7/2008 | Shivaji-Rao | H04N 17/004 |
| 2008/0201131 A1 | 8/2008 | Kar et al. | |
| 2008/0221893 A1* | 9/2008 | Kaiser | G10L 15/24 704/257 |
| 2009/0171956 A1* | 7/2009 | Gupta | G06F 17/30705 |
| 2009/0231359 A1 | 9/2009 | Bass, II et al. | |
| 2009/0274434 A1* | 11/2009 | Mei | G06K 9/00711 386/278 |
| 2010/0256969 A1* | 10/2010 | Li | G06K 9/6296 703/16 |
| 2011/0106741 A1* | 5/2011 | Denneau | H04L 47/521 706/25 |
| 2012/0059779 A1* | 3/2012 | Syed | G06F 19/3431 706/12 |
| 2013/0230255 A1* | 9/2013 | Wang | G06F 17/30247 382/201 |
| 2013/0279806 A1* | 10/2013 | Tonisson | G06T 7/2033 382/173 |
| 2014/0337005 A1* | 11/2014 | Abdel-Hady | G06F 17/30705 704/2 |
| 2015/0006443 A1* | 1/2015 | Rose | G06N 99/005 706/12 |
| 2015/0206068 A1 | 7/2015 | Davidovich et al. | |
| 2016/0350671 A1 | 12/2016 | Morris, II et al. | |
| 2017/0017900 A1 | 1/2017 | Maor et al. | |

OTHER PUBLICATIONS

Notice of Allowance dated Feb. 22, 2016 From the U.S. Patent and Trademark Office Re. U.S. Appl. No. 14/595,394.
Official Action dated Jul. 29, 2015 From the U.S. Patent and Trademark Office Re. U.S. Appl. No. 14/595,394.
Neamtiu et al. "Understanding Source Code Evolution Using Abstract Syntax Tree Matching", MSR '05 Proceedings of the 2005 International Workshop on Mining Software Repositories, ACM SIGSOFT Software Engineering Notes, 30(4): 1-5, Jul. 2005.
Sanz et al. "On the Automatic Categorisation of Android Applications", The 9th Annual IEEE Consumer Communications and Networking Conference: 149-153, Jan. 14-17, 2012.
Shabtai et al. "Automated Static Code Analysis for Classifying Android Applications Using Machine Learning", International Conference on Computational Intelligence and Security (CIS): 329-333, Dec. 11-14, 2010.
Official Action dated Dec. 5, 2016 From the U.S. Patent and Trademark Office Re. U.S. Appl. No. 15/165,059.(23 Pages).
Arnold et al. "Feature Discovery in the Context of Educational Data Mining: An Inductive Approach", Proceedings of the AAAI2006 Workshop on Educational Data Mining: 7-13, Boston, MA 2006.
TechTarget "Key-Value Pair (KVP)", Definition from Whatis.com, 1 P., Jan. 17, 2012.
Official Action dated Oct. 26, 2017 From the U.S. Patent and Trademark Office Re. U.S. Appl. No. 15/165,059. (22 pages).
Official Action dated Jun. 4, 2018 From the U.S. Patent and Trademark Office Re. U.S. Appl. No. 15/165,059. (22 pages).
Hurwitz et al. "Key-Value Pair Databases in a Big Data Environment", Big Data for Dummies, pp. 89-91, 2013.
Advisory Action Before the Filing of an Appeal Brief Dated Aug. 31, 2017 From the U.S. Patent and Trademark Office Re. U.S. Appl. No. 15/165,059. (4 pages).
Official Action dated Jun. 15, 2017 From the U.S. Patent and Trademark Office Re. U.S. Appl. No. 15/165,059.(22 Pages).
Refaeilzadeh et al. "Cross-Validation." Encyclopedia of Database Systems, Springer US: 532-538, 2009.
Official Action dated Dec. 12, 2018 From the U.S. Patent and Trademark Office Re. U.S. Appl. No. 15/165,059. (15 pages).
Xiang et al. "Detecting Offensive Tweets via Topical Feature Discovery over a Large Scale Twitter Corpus", In Proceedings of the 21st ACM International Conference on Information and Knowledge Management, pp. 1980-1984, 29. Oct. 2012.

* cited by examiner

_US 11,250,342 B2_

SYSTEMS AND METHODS FOR SECONDARY KNOWLEDGE UTILIZATION IN MACHINE LEARNING

RELATED APPLICATIONS

This application claims the benefit of priority under 35 USC 119(e) of U.S. Provisional Patent Application Nos. 62/193,199 and 62/193,196 both filed on Jul. 16, 2015, the contents of which are incorporated herein by reference in their entirety.

FIELD AND BACKGROUND OF THE INVENTION

The present invention, in some embodiments thereof, relates to machine learning and, more specifically, but not exclusively, to systems and methods for generation of classification features for use in a machine learning process. The process of machine learning utilizes data (in the form of a training set) to learn to classify and/or predict new data. A set of training data representing a spectrum of examples, which are optionally labeled, is provided. An example of an entry in the training dataset includes a vector of numeric, Boolean, categorical, and/or string values. Labels, which represent different possible target classification or prediction values, may be, for example, Boolean, numerical, categorical, and/or string. Features are extracted from each member of the set of training data. The features, along with the labeling, are used to train a machine learning method, for example, a statistical classifier, to classify and/or predict new unseen data, based on the assumption that the unseen data is based on a distribution similar to that of the training set.

For example, a machine learning system may be created by training a machine learning method using a training set of blood test values from many patients, each blood test value labeled with the state of the patient having a certain disease (i.e., 'sick') or not (i.e., 'healthy'). When the machine learning system receives a new input of a set of patient blood test values, the system outputs a result of whether or not the corresponding patient has the certain disease. Other examples of machine learning applications include: prediction of significant changes in stock market index value.

In order to try and obtain accurate prediction, data scientists invest considerable time and effort in the manual design and construction of the training datasets, by deciding what data to include in the training dataset. Given the large number of possible combinations of the data that may be combined for including in the training dataset, such a process may be time consuming, expensive and error prone. The number and sizes of potential training datasets may be very large. For example, when considering large publicly available data sources, such as online databases accessible using the internet, for example, online encyclopedias, economics datasets, healthcare datasets, and the like.

SUMMARY OF THE INVENTION

According to an aspect of some embodiments of the present invention there is provided a computer implemented method for combining datasets for use in an automated machine learning process, comprising: receiving a designation of a primary training dataset comprising a plurality of primary data instances, each primary data instance including a plurality of primary fields each assigned at least one value, each primary data instance associated with a classification label; receiving a designation of at least one secondary dataset each comprising a plurality of secondary data instances, each secondary data instance including a plurality of secondary fields, each secondary data being unclassified; identifying, for a first set of values of at least one primary field of the plurality of primary fields, a second set of secondary fields of the at least one secondary datasets according to the first set of values matched to corresponding values in at least one respective secondary field of at least one secondary dataset according to a matching requirement; linking each respective matched value of the first set of values, to other secondary fields of at least one respective secondary data instance of the respective matched secondary field; generating a set of classification features based at least on the linked second set of secondary fields, each classification feature for application to at least one field from the linked second set of secondary data fields; applying each classification feature of the generated set of classification features to each linked second set of secondary fields to generate a set of extracted features; selecting a subset of pivotal classification features from the set of classification features according to a correlation requirement between the classification label of the primary data instance corresponding to the linked secondary field used in the respective classification feature, and each respective member of the set of extracted features extracted by the respective classification feature; identifying a subset of pivotal secondary fields based on the secondary fields associated with each selected pivotal classification feature; creating an enhanced training dataset by linking the subset of pivotal secondary fields to the primary training dataset; and documenting at least one of the selected subset of pivotal features and enhanced training dataset for use in an automated machine learning process.

Optionally, the method further comprises iterating the method until a stop condition is met, by designating the enhanced training dataset, and repeating the identifying the second set of secondary fields, linking, generating, applying, selecting, identifying the subset of pivotal secondary fields, and the creating, using the designated enhanced training dataset.

Optionally, at least some of the features extracted from at least one secondary field are statistically insignificantly correlated with the classification label.

Optionally, the matching requirement includes a percentage of the first set of values of the respective primary field matching the corresponding values in the respective secondary dataset.

Optionally, the matching requirement comprises that the first set of values is selected by sampling a subset of values of the at least one primary field.

Optionally, the method further comprises preparing, for each secondary dataset, a set-representation of the plurality of secondary fields, and using the set-representation to match the first set of value and to identify the second set.

Optionally, at least one member of the at least one secondary dataset is selected from the group consisting of: a table wherein each row represents a secondary data instance and each column represents a secondary field and a graph comprising linked data.

Optionally, at least one primary field includes a third set of data elements each assigned a value, and wherein identifying comprises identifying for the first set of values of a subset including at least one data element of the third set.

Optionally, generating the set of classification features comprises generating at least one binary classification feature that extracts a binary value from at least one of the linked secondary data fields. Optionally, the at least one binary classification feature includes at least one mathematical condition applied to at least one value of the linked secondary data fields of other data instances. Optionally, the at least one mathematical condition is selected from the group consisting of: greater than, less than, equal to, greater than or equal to, less than or equal to, and containing the at least one value.

Optionally, the method further comprises automatically designating at least one secondary dataset based at least one object type of at least one secondary field that corresponds to at least one object type of the primary training dataset.

Optionally, the method further comprises analyzing at least one primary data field to extract at least one entity according to at least one object type, and wherein identifying comprises identifying the second set of secondary fields according to the object type of the first set of values of the at least one extracted entity.

Optionally, the method further comprises converting values in at least one of: the primary training dataset and the at least one secondary data set to a canonical representation, and performing the identifying based on the canonical representation.

Optionally, the method further comprises training a statistical classifier based on the selected subset of pivotal features applied to the enhanced training dataset, and the associated data classification labels.

Optionally, the method further comprises classifying a new data instance to at least one of the data classification labels, by applying each classification feature of the selected subset of pivotal features to the new data instance to extract a plurality of features and applying the statistical classifier to the plurality of extracted features to output at least one of the data classification labels.

According to an aspect of some embodiments of the present invention there is provided a system to create an enhanced training dataset for use in an automated machine learning process, comprising: a primary interface for communication with a first storage unit storing thereon a primary training dataset comprising a plurality of primary data instances, each primary data instance including a plurality of primary fields each assigned at least one value, each primary data instance associated with a classification label; a secondary interface for communication with at least one second storage unit storing thereon at least one secondary dataset each comprising a plurality of secondary data instances, each secondary data instance including a plurality of secondary fields, each secondary data being unclassified; a program store storing code; and a processor coupled to the primary interface, the secondary interface, and the program store for implementing the stored code, the code comprising: code to identify, for a first set of values of at least one primary field of the plurality of primary fields, a second set of secondary fields of the at least one secondary datasets according to the first set of values matched to corresponding values in at least one respective secondary field of at least one secondary dataset according to a matching requirement, to link each respective matched value of the first set of values, to other secondary fields of at least one respective secondary data instance of the respective matched secondary field, to generate a set of classification features based at least on the linked second set of secondary fields, each classification feature for application to at least one field from the linked second set of secondary data fields, to apply each classification feature of the generated set of classification features to each linked second set of secondary fields to generate a set of extracted features, to select a subset of pivotal classification features from the set of classification features according to a correlation requirement between the classification label of the primary data instance corresponding to the linked secondary field used in the respective classification feature, and each respective member of the set of extracted features extracted by the respective classification feature, to identify a subset of pivotal secondary fields based on the secondary fields associated with each selected pivotal classification feature, to create an enhanced training dataset by linking the subset of pivotal secondary fields to the primary training dataset; and to store at least one of the selected subset of pivotal features and enhanced training dataset for use in an automated machine learning process.

Optionally, the system further comprises a physical user interface coupled to the processor, the user interface set to allow a user to designate the primary training set and the at least one secondary dataset.

Optionally, at least one secondary dataset is a publicly accessible database residing on a remote server, accessible over a network.

Optionally, at least one secondary dataset is retrieved from content published by a website.

Optionally, the matching requirement is based a maximum number of links and a processing time for creating the enhanced training dataset using a target processing unit.

Optionally, the method further comprises code that automatically crawls along at least one of links on a network and stored file in the at least one second storage unit, the code automatically designates the at least one secondary dataset according to at least one object type that corresponds to at least one object type of the primary training dataset.

According to an aspect of some embodiments of the present invention there is provided a computer program product comprising a non-transitory computer readable storage medium storing program code thereon for implementation by a processor of a system for creating enhanced training datasets for use in an automated machine learning process, the program code comprising: instructions to receive a designation of a primary training dataset comprising a plurality of primary data instances, each primary data instance including a plurality of primary fields each assigned at least one value, each primary data instance associated with a classification label; instructions to receive a designation of at least one secondary dataset each comprising a plurality of secondary data instances, each secondary data instance including a plurality of secondary fields, each secondary data being unclassified; instructions to identify, for a first set of values of at least one primary field of the plurality of primary fields, a second set of secondary fields of the at least one secondary datasets according to the first set of values matched to corresponding values in at least one respective secondary field of at least one secondary dataset according to a matching requirement; instructions to link each respective matched value of the first set of values, to other secondary fields of at least one respective secondary data instance of the respective matched secondary field; instructions to generate a set of classification features based at least on the linked second set of secondary fields, each classification feature for application to at least one field from the linked second set of secondary data fields; instructions to apply each classification feature of the generated set of classification features to each linked second set of secondary fields to generate a set of extracted features; instructions to select a subset of pivotal classification features from the set of classification features according to a correlation requirement between the classification label of the primary data instance corresponding to the linked secondary field used in the respective classification feature, and each respective member of the set of extracted features extracted by the respective classification feature; instructions to identify a subset of pivotal secondary fields based on the secondary fields associated with each selected pivotal classification feature; instructions to create an enhanced training dataset by linking the subset of pivotal secondary fields to the primary training dataset; and instructions to document at least one of the selected subset of pivotal features and enhanced training dataset for use in an automated machine learning process.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
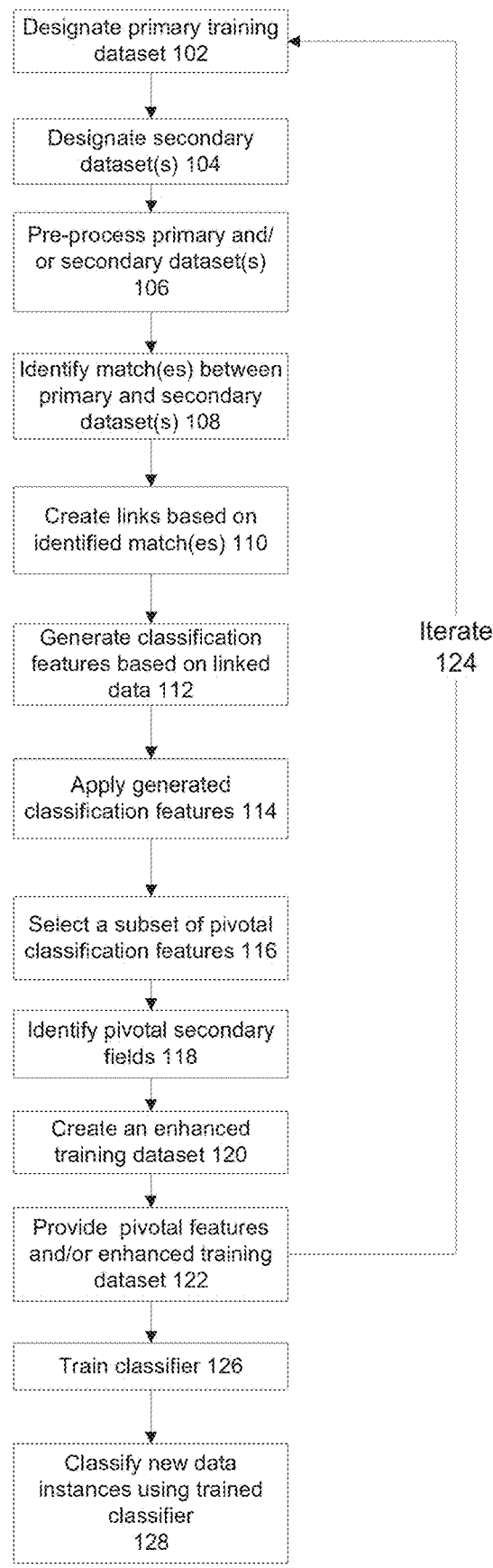
FIG. 1 is a flowchart of a process of automatically generating a set of classification features based on a second set of secondary fields linked to a primary training dataset, in accordance with some embodiments of the present invention.

The present invention, in some embodiments thereof, relates to machine learning and, more specifically, but not exclusively, to systems and methods for generation of classification features for use in a machine learning process.

An aspect of some embodiments of the present invention relates to systems and/or methods that automatically generate a set of pivotal classification features that process at least some data retrieved from initially unrelated secondary data sources and optionally from a primary dataset for use in an automated machine learning process. The pivotal classification features are identified based on selected portions of relevant secondary data sources that yield statistically significant and/or accurate classification results in classifying and/or predicting a new data instance to a classification variable. The generated pivotal classification features extract values from fields corresponding to the fields of the primary and/or secondary data sources.

In this manner, classification features that extract data from fields which have not been explicitly designated as significant inputs into a machine learning process are automatically identified from a larger pool of possible fields.

The set of pivotal classification features may be selected according to a correlation requirement between the classification label of the primary data instance corresponding to the linked secondary field and the extracted feature. The set of pivotal classification features may be selected from a larger set of possible classification features according to correlation requirement(s).

Optionally, at least some of the secondary fields are statistically irrelevant (i.e. insignificant statistical correlation) in predicting the new data instance. Some of the secondary fields may not be statistically significantly correlated with classification variables. The systems and/or methods described herein generate pivotal classification features that process statistically significant secondary fields, and do not necessarily process the statistically insignificant secondary fields. Statistical relevant and/or statistical irrelevance may be defined by a requirement, such as a threshold, for example, a correlation value of >0.9, or >0.8 representing statistical significance and/or a value of <0.5 or <0.7 representing insignificance, or other values.

The primary training dataset includes primary data instances, each representing a classified observation (e.g., by a classification label associated with each data instance). Each primary data instance includes one or more primary fields, each assigned one or more values.

The secondary dataset(s) include secondary data instances, each including multiple secondary fields assigned one or more values. The secondary data instances represent observations of data that may not necessarily be related to the primary data instances. The secondary data instances may be unclassified and/or unlabelled data.

The relationship between the primary and secondary datasets may not be known before identification of the relationship by the systems and/or methods described herein. It is noted that brute force linkages, in which different combinations of links between primary and secondary fields are blindly matched using combinatorics (i.e. without consideration of relevance) are infeasible in terms of computational ability, for example, as the number of possible combinations may be very high (e.g., when each dataset includes dozens, hundreds, or thousands of fields), processors and/or storage units may not be able to process all combinations in a reasonable finite time frame.

Optionally, for one or more first sets of values of primary field(s) of the primary training dataset, one or more second sets of secondary fields of secondary dataset(s) are selected. The selection is performed according to a matching requirement, that defines criteria for the match between the first set of values and corresponding values in respective secondary field(s) of secondary dataset(s). Each identified matched value in the primary dataset is linked to other secondary fields of the secondary data instance associated with the matched secondary field.

Optionally, an enhanced training dataset is created from the primary dataset by selecting and linking the most relevant secondary fields from the linked secondary instances. The most relevant secondary fields may be selected based on an increase in statistical relevance and/or accuracy in prediction and/or classification (e.g., compared to the primary dataset alone) using the pivotal classification features. Optionally, the most relevant secondary fields are identified from the selected set of pivotal classification features, according to the secondary fields being processed by each selected pivotal classification feature.

The enhanced training dataset may be used in an iterative process, to generate additional pivotal classification features from additional secondary data sources (which may be different than the initial or previous set of secondary datasets). The enhanced training dataset (e.g., final set after the iterations have stopped) may be provided for use in an automated machine learning process, such as to train a statistical classifier.

The enhanced training dataset and/or the selected subset of pivotal classification features may be used in a machine learning system and/or process. The use of the enhanced training dataset and/or the selected subset of pivotal classification features may increase the accuracy and/or statistical significance of a trained statistical classifier, and/or increase the accuracy and/or statistical significance of classification of a new data instance (i.e., by extraction of the newly identified secondary fields) by the trained classifier.

The systems and/or methods described herein improve automated machine learning systems and/or methods, by automatically creating an enhanced training dataset that includes the identified secondary data fields retrieved from secondary datasets, and/or by automatically generating a subset of pivotal classification features that process the selected secondary data fields.

The systems and/or methods described herein may generate new data (which may be stored locally and/or remotely, or transmitted to another server) that includes the enhanced training dataset (by linking the primary training dataset with the secondary field(s) of the secondary dataset(s)). The systems and/or methods described herein may generate new data that includes a new set of pivotal classification features that process one or more of the linked secondary fields of the secondary dataset(s).

The enhanced training set and/or new subset of pivotal features may be implemented by machine learning processes and/or systems for improving the machine learning process and/or system, such as in terms of improvements in classification accuracy, improvements in computing resources utilization, and/or improvements in time taken to perform the classification.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the terms classify (and variations thereof) and predict (and variations thereof) are interchangeable.

As used herein, the terms entity and object are sometimes interchangeable.

As used herein, the term statistical classifier (or classifier) broadly means a predictive model and/or classification machine learning model, for example, a statistical classifier, a regression function, a look-up table, decision tree learning, artificial neural networks, and Bayesian networks.

As used herein, the term function means a relation between inputs and outputs such that each input (or set of inputs) is related to one output. The function performs an operation on the input(s) to generate the output(s), for example, a mathematical calculation, and/or other data processing methods such as data analysis. Functions may be mathematical functions, and/or functions designed to process data, such as numeric and/or non-numeric data. Examples of functions include: a function that operates on text and returns the sentiment of the text (e.g., positive, negative, or neutral), a function that converts a string to upper case, and/or a function that performs a mathematical operation on numerical data.

Figure 2:
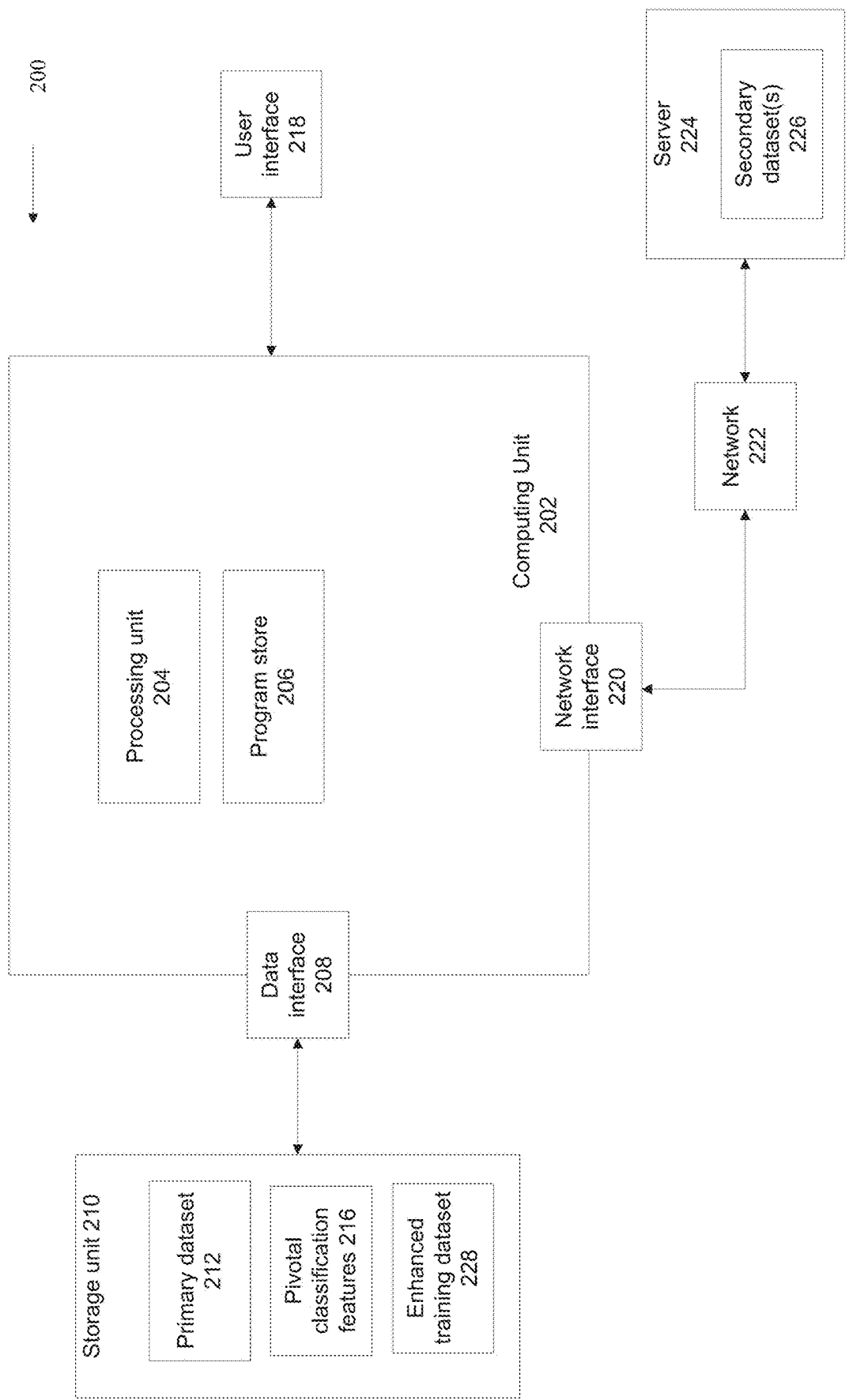
FIG. 2 is a block diagram of components of a system that automatically generates a set of classification features based on a second set of secondary fields linked to a primary training dataset, in accordance with some embodiments of the present invention.

Reference is now made to FIG. 1, which is a flowchart of a process of automatically generating a set of classification features based on a second set of secondary fields linked to a primary training dataset that classify and/or predict a new received data instance, in accordance with some embodiments of the present invention. Reference is also made to FIG. 2, which is a block diagram of components of a system that automatically generates a set of pivotal classification features from secondary data linked to primary data. The set of pivotal classification features are used to classify and/or predict a new received data instance. The generated features may accurately predict the data instance in a resource limited computing system (i.e., finite processing resources and storage) within a reasonable time frame (e.g., to allow users to act upon the result, to free up the resources for other uses), which may be a predefined time (e.g., manually inputted by the user, automatically selected by code, and/or obtained from a system configuration file). The systems and/or methods described herein automatically create the enhanced dataset and/or automatically create the pivotal classification features, from a user designated primary training dataset set and one or more sources of secondary data. The method of FIG. 1 may be executed by the system of FIG. 2.

The systems and/or methods described herein attempt to improve an underlying technical process within the technical field of machine learning. The technical problem addressed is that of designing a process that automatically generates a pivotal set of features from relevant secondary data selected from a large set of secondary data (which may include statistically irrelevant data) which is linked to a primary training dataset. The technical problem addressed may include creation of an enhanced dataset based on the selected relevant secondary dataset for use in a machine learning process. The relevancy of the secondary data to classification of a new data instance to a classification variable is not necessarily known in advance. It may not be clear which (if any) of the secondary data is relevant and/or how to link the secondary data to the primary dataset to improve classification. The enhanced dataset is used to identify the subset of pivotal classification features to apply, using a machine learning method (e.g., statistical classifier), to a received data instance, to classify and/or predict a classification variable, where the classification is performed in a machine learning and/or classification computer system having limited processing capabilities and limited storage capacity, within a reasonable time frame. The number of possible combinations of links between each data object (and/or field) from a training dataset and each data object (and/or field) of the large set of secondary data may become too numerous. Processing such a large number of combinations, by considering every possible link, is computationally intensive and impractical (e.g., in terms of processing time, processing resource requirements and/or storage requirement).

The secondary data that is added to the primary data is selected to generate pivotal classification features that increase the accuracy and/or statistical significance of classification (i.e., provide a relatively higher correlation to the classification variable using the secondary data linked to the primary data than using the primary data alone). The pivotal classification features created from the linked secondary data may increase the accuracy and/or statistical significance of classification by a trained classifier without necessarily increasing the requirement of computational resources.

The classification result (e.g., with higher relative accuracy) may be achieved using the resource limited computing device in a reasonable time (e.g., on the order of second, hours or days, instead of, for example, months and years). The systems and/or methods described herein are designed to generate a new set of data including the enhanced training dataset and/or set of pivotal features that is statistically accurate and/or may be executed in the resource limited computer system in the reasonable time frame.

The systems and/or methods described herein improve performance of the computer system executing a classification method and/or executing a machine learning method, by automatically generating the links between the primary and secondary data and/or by automatically selecting the pivotal set of classification features that improve classification accuracy without significantly increasing computing resource requirements (e.g., processor utilization and/or storage requirements), for example, in comparison to other methods, and/or according to a predefined utilization requirement (e.g., designed to operate on a single CPU) and/or predefined time requirement. It is noted that the systems and/or methods described herein may decrease computing resource utilization.

The systems and/or methods described herein provide a unique, particular, and advanced technique of automatically creating a set of pivotal classification features for machine learning. The pivotal classification features extract features from secondary sources of data that are automatically linked to a primary training dataset.

The enhanced training dataset generated during the process of creation of the pivotal classification features may be used in the machine learning process. The systems and/or methods described herein process data organized in a specific manner, namely as data instances (described herein), to generate other new data organized in a specific manner, namely enhanced data instances and/or a set of pivotal features (as described herein).

The systems and/or methods described herein attempt multiple transformations (i.e., classification features) on objects, which may be complex objects, to identify the transformations that are associated with a statistically significant relation with a target and/or dependent variable. The set of transformations to attempt may not be necessarily known in advance without evaluation using the enhanced training dataset.

Generation of the pivotal classification features based on the enhanced training dataset is performed by incorporation of secondary data from the complex objects into the primary dataset.

The transformations are evaluated, and the statistical relevance and/or predictive power in predicting or classifying the classification variable is determined. After an initial set of relevant transformations have been identified, the set of pivotal classification features may be further narrowed (e.g., applying feature selection techniques). Narrowing may be performed for each iteration of addition of secondary data to the training set, or upon generation of the enhanced training after several iterations of adding secondary data. The final set of transformation may be used to create a predictive model combining the identified pivotal classification features and/or the enhanced training dataset.

System 200 includes computing unit 202, for example, a personal computer, a mobile device (e.g., Smartphone, Tablet), a wearable device (e.g., computing glasses, computing watch), and/or a server. Computing unit 202 includes a processing unit 204, for example, a central processing unit (CPU), a graphics processing unit (GPU), field programmable gate arrays (FPGA), digital signal processor (DSP), and application specific integrated circuits (ASIC). Processing unit 204 may include one or more processors (homogenous or heterogeneous), which may be arranged for parallel processing, as clusters and/or as one or more multi core processing units.

Computing unit 202 includes a program store 206 storing code implementable by processing unit 204, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Computing unit 202 may include multiple computers (having heterogeneous or homogenous architectures), which may be arranged for distributed processing, such as in clusters.

Computing unit 202 includes a data interface 208 for communicating with a storage unit 210, which may be installed within computing unit 202, as an external device (e.g., accessible via a local connection), and/or located on a remote server 224, accessible over a network 222 via a network interface 220 (which may be integrated with data interface 208).

Computing unit 202 may include a physical user interface 218, for example, one or more of: a display, a touch screen, a keyboard, a mouse, and voice activated interface. User interface 218 may allow a user to designate the primary training set and/or the secondary datasets, for example, by a menu allowing selection of a file containing the primary and/or secondary data, for clicking on a link to a website storing the primary and/or secondary data, and/or by allowing the user to manually enter a path to the location of the stored primary and/or secondary data.

Blocks of the method of FIG. 1 may be represented as instructions in code stored in program store 206, implementable by processing unit 204.

At 102, a primary training dataset is designated, for example, primary training dataset 212. Training dataset 212 may be stored on storage unit 210, accessible by processing unit 204 using data interface 208, and/or retrieved from remote server 224, for example, from an online document store. Designation may be performed manually by a user (using user interface 218), and/or automatically by code, and/or based on a file defining system configuration parameters. Training dataset 212 may be designated from a larger collection of data, for example designated according to the classification variable described herein. User interface 218 may be used to set a pointer (e.g., file pointer, and/or link) to the primary training dataset.

The primary training dataset may include training data for training a statistical classifier. The primary training dataset may be formatted for use by an automated statistical classifier, for example, organized as a vector. The primary training dataset may be labeled with classification values, for training the statistical classifier.

The primary training dataset may include raw data and/or data formatted for processing.

The primary training dataset may include multiple data instances, each including a set of primary fields each assigned one or a set of values. The values in the fields may be represented as objects of arbitrary type or known type. Objects may be, for example, of complex types, such as time series, vector, map, graph, and tree.

Objects may be, for example, of simple types, such as integer, real number, string, categorical (i.e., set), and Boolean. It is noted that the complex types may be built from the simple types. Each data instance represents an observation that is associated with a predicted or classified variable value represented as a classification label. Optionally, the training data set includes raw data, for example, generated as an output of a sensor (or other measurement device), and/or generated as an output of a computer process implemented by code. Optionally, the raw data instances are classified, for example, manually by a user, automatically by code using a clustering method, and/or automatically by code based on other methods, or the classification is predefined.

The training dataset may be stored using a suitable abstract representation. The abstract representation may map between data instances and data (i.e. information), for example, as a table, matrix, and/or database, with each row representing respective data instances, and each column representing a primary field containing values represented as objects. The training dataset may be stored, for example, as a matrix like file, for example, a comma separated values (CSV) file.

It is noted that when the training dataset includes raw values, which may be represented as arbitrary objects, and/or which may be unclassified, the method described with reference to U.S. Provisional Patent Application having Attorney Docket No. 62746 may be applied to process the raw unclassified data of arbitrary object type.

It is noted that the primary training dataset may be used to train a statistical classifier without inclusion of the secondary data sources (as described herein), using standard machine learning methods. Inclusion of the secondary data sources (as described herein) improves the accuracy and/or statistical significant of the statistical classification, and/or improves computational performance (e.g., use of computational resources) of the classification process.

At 104, one or more secondary dataset are designated. Designation may be performed manually by a user (e.g. using user interface 218) and/or automatically by code. The secondary dataset represent data for which is it not known in advance which portions thereof are statistically relevant (e.g., correlated) to a statistical classification problem, and/or how the portions are relevant.

The secondary datasets include data from one or more secondary sources, for example, secondary dataset (and/or sources) 226 stored on a remote data server 224 (such as a publicly accessible server) and/or locally stored on storage unit 210.

Optionally, at least one secondary dataset is a publicly accessible database residing on remote server 224, accessible over network 222. Optionally, the secondary dataset is retrieved from content published by a website and stored on a web server. User interface 218 (and/or code instructions) may be used to manually and/or automatically set a pointer to the secondary dataset, for example, a designation of a file path of a locally stored database, and/or a designation of a link to an online database stored on a remote web server.

The secondary datasets may be automatically designated by code, for example, by a crawling program that searches the internet (and/or local storage devices) using keywords to identify databases and/or other sources of information, or for example, by a linking program that follows links from a source (e.g., website) which has previously been identified as containing relevant secondary data (e.g., in an earlier iteration of the method). The secondary dataset may be manually designated by the user, for example, to generic databases containing broadly applicable data (e.g., temperature, population demographics, and census data), and/or to specialized databases containing specialized databases which may be based on a gut feeling or hunch as possibly being related to the classification problem and/or primary dataset (e.g., medical databases, real-estate databases, and geological surveys).

The secondary dataset(s) may include raw data and/or data formatted for processing.

Each secondary dataset may include multiple secondary data instances. Each secondary data instance may include secondary field(s). Each secondary field may be associated with one or more objects (e.g., as described herein with reference to block 102). Each secondary data instance may be unclassified during designation.

Optionally, the secondary dataset is represented as a table (or database, or other equivalent data structure representations). Each row of the table may represent a secondary data instance. Each column of the table may represent a secondary field.

Alternatively or additionally, the secondary dataset is represented as linked data, for example, linked data, and a graph.

Other representations of the secondary dataset may be used, for example, canonical representations defined by Web2.0 to described knowledge and relations.

Optionally, the secondary data includes raw data, for example, obtained from complex objects from an operational system, an online document store, and/or by joining data together (e.g., joining tables). The raw secondary data may be stored (and/or processed and/or formatted) in tabular form (or other corresponding representation), optionally in multiple interlinked tables, for example, in relational databases. In one example, operational systems may use object oriented data structures where complex objects have various interlinks between them.

A flat form of the object oriented data structures may be created (e.g., by code having instructions to perform such conversion) before attempting to process the secondary data for linking, or alternatively, the object oriented data structures are processed using existing forms or other modified forms. Data objects which do not have a 1-1 relationship with the primary dataset (e.g., 1-1 relationship with a primary field(s)) may be joined, for example, using an aggregated method for each joined field (e.g., column). For example, aggregation of historical data (e.g., stock prices and respective dates) may be performed by creation of a time series. It is noted that the pre-processing may be performed as part of block 106, which may be performed concurrently with designation of the secondary sources.

Some examples of primary training datasets and secondary datasets are now described.

In one example, the classification problem is related to predicting employees at high risk of churning (e.g., in the next month). Primary training datasets may be generated from databases of employee data, for example, name, identification number, years of service, salary, gender, rank, yearly review, and co-worker feedback.

Classification may be based on history of workers that have previously left the organization (i.e., churned) and workers that remained (i.e., not churned). Potentially relevant sources of secondary data may be designated from inside the organization and from outside the organization. Examples of intra-organizational data includes: a first table that includes the average salary for each department, and another table that includes a description (in free text) of employee evaluations provided by clients as service feedback. Examples of extra-organizational data include: databases storing monthly job openings for different positions, and average salary for different professions.

In another example, the classification problem is related to predicting whether or not a riot will erupt in a certain location (e.g., city, country, county, and/or state).

The primary training dataset may include the name of the location, and a classification value representing whether a riot has occurred in the past or not at the respective location. Secondary data sources may be designated, for example, as reported news items (which may be sorted according to time and/or geographical location), economical data for different locations, health data for different locations, and/or a table of distances between different cities, and links between each city and its geo-coordinates, area, climate, and population density.

In yet another example, the classification problem is related to predicting the percentage of people that will experience non-minor sickness for an upcoming week per region in a country. The primary dataset may include databases of non-minor sickness, for example, hospital admissions, and health insurance claims. Secondary data sources may include temperature for different cities, air pollution levels for different cities.

At 106, the primary and/or secondary datasets are pre-processed, for example, by code instructions stored in program stored 206, implementable by processing unit 204.

Optionally, entities are extracted from the primary and/or secondary datasets. Entities may be extracted from one or more primary fields, which may include unstructured data, for example, unstructured data objects, and/or free form text (e.g., a text file). The entities may be extracted according to one or more predefined object types, for example, names of countries, names of business departments, employee names, and the like. Entities may be selectively identified from the values in the primary fields, optionally leaving other data unselected, i.e., non-entity values. In this manner, relevant data which may be linked to secondary data is identified from the primary data, which may prevent or reduce processing of irrelevant items, for example, terms such as "and", "like", and "the" in free form text. Now, the process described herein uses the extracted entities to identify and/or link to secondary data fields.

Optionally, the extracted entities are processed into a suitable data structure, for example, into a column of a table, and/or nodes of a graph. The suitable data structure may be selected to improve the linking with the secondary data fields.

Entities may be extracted from portions of the datasets, for example, from a field (e.g., column of a table). Named entities appearing in a defined portion may be extracted, for example, code may identify that the field(s) of data instances include cities, dates, geographic coordinates, id numbers, and the like. Named entities may be identified from a field that includes free text, for example, an employee's evaluation manually entered by a supervisor and/or client, and/or a news article. In the case of free text, the code may identify entities in the free text, for example, the name of the employee, the department in which the employee works, and/or the city and/or country in which the employee works.

It is noted that multiple entities may be extracted from a single primary field. The extracted entity may be a single entity, or a collection (e.g., set) of entities.

Optionally, the secondary dataset(s) is automatically designated based on the success of extracting the entities, for example, based on a requirement, such as a threshold or a binary value designating ability or inability to extract relevant data. For example, secondary fields of secondary dataset(s) may be designated based on inclusion of objects of a type that correspond to (and/or are defined by) one or more fields of the primary training dataset, for example, to fields that include names of workers, names of departments, or graph entities related to cities and/or countries.

Optionally, code automatically crawls along links on network and/or files stored in a storage device to identify data sources that include one or more object types (and/or fields) that correspond to one or more object types and/or fields of the primary dataset. It is noted that in this manner, blocks 104 and 106 may occur simultaneously and/or iteratively.

Optionally, non-entities are removed from the designation (or not included in the automatic designation). Non-entities may include fields, or entries in the field itself, for example, certain words in a field of free text.

Identification of the entities may improve performance of the method and/or system, by reducing computations and/or use of computational resources, as non-entities are assumed to be of low (or no) significance to the classification variable.

Alternatively or additionally, the pre-processing includes converting values in the primary training dataset and/or the at least one secondary data sets to a canonical representation. Conversion to the canonical presentation may improve accuracy and/or statistical relevant of the classification, for example, by increasing the probability of identifying a match between the values of the primary and secondary sets, as described with reference to block 108. The identifying of the match may be performing based on the canonical representation. Examples of canonical representations include: conversion of names (or all text characters) to lower case, and/or conversion of numbers (or other codes, such as employee IDs) to a representation without training zeros, and/or hyphens. The canonical representation improves the probability of matching of data in two fields, for example, when one field includes names in capital letters and another field includes names in lower case, conversion to the canonical representation would result in a match, such as between SMITH and smith.

At 108, the code (implementable by the processing unit) identifies a second set of one or more secondary fields (from one or more secondary datasets) as a match to a first set of one or more values from one or more primary fields of the primary training dataset. The first set of values is matched to corresponding values in respective secondary field(s) of the secondary dataset. Optionally, (e.g., all) corresponding fields of the matched values are linked. Alternatively, only the matching values are linked.

For example, the primary training dataset includes a field of employee ID numbers, having ID values: 123ABC, 456DEF, and 789GHI. The secondary dataset includes triples of the form (employee ID, department, position). If the secondary dataset includes matching ID values 123ABC, 456DEF, and 789GHI, then the fields department and position may be linked to the primary training dataset, by linking matching values of employee IDs (e.g., 123ABC of the primary training dataset to 123ABC of the secondary dataset). In this manner, each instance of the primary training dataset has been expanded to include the additional fields of department and position. Links may be made between the matching employee IDs, or alternatively, the primary dataset is expanded to include the additional fields for all (or selected subset of) data instances. Additional details of linking are described with reference to block 110.

In terms of mathematical representation, let S be a set of values (or entities) that stem from a field (e.g., column) of the primary training dataset (e.g., table form). A column $T_j$ of secondary fields is in a secondary dataset (e.g., table) T.

The matching may be performed as a look-up operation, using a set of values from one dataset to look for corresponding values in another dataset. The look-up operation may be repeated multiple times, for example, using the same set of values to look at different corresponding values in the other dataset, or using different sets of values to look-up within the same set of data of the other dataset to find corresponding values. The look-up operation may return a single value, a collection (e.g., set), or may not return any matches. Sets may be found, for example, when the look-up field is not unique within the secondary data source (e.g., table and/or graph).

The identification may be performed according to a matching requirement, which may be manually defined by the user and/or automatically determined by code.

The matching requirement may represent resources which may be used to identify the matches, instead of, for example, exhaustively going through every possible combination, which would require significant computing resources.

Optionally, the matching requirement includes a percentage of the first set of values of the respective primary field matching the corresponding values in the respective secondary dataset. In terms of mathematical representation, coverage of the value set S by Tj may be defined as the fraction (or percentage) of values of S that correspond to an entry in Tj: |{d in S} such that d appears in Tj|/|S|. When the calculated fraction (or percentage) is above the requirement, then S may be linked to T via column (or field) j. Examples of requirements include: over at least 90% (or 0.9), over at least 75%, over at least 50%, or other smaller, intermediate, or larger values.

Alternatively or additionally, the matching requirement may include an absolute number of the first set of values matching values in the secondary dataset, for example, at least 1 value, or at least 5 values, or at least 10 values, or other smaller, intermediate or larger values. Alternatively or additionally, the matching requirement may be a function, based on absolute variables and/or dynamically determined variables. Other requirements may be used.

In another example, the secondary dataset may include a graph representation G, for example a graph representation of knowledge, represented in graph form and/or relational form (e.g., relational triplet). In such a case, the fraction (or percentage) of values of S which correspond to nodes in the graph G are identified: |{ d in S} such that d appears in Tj|/|S|. When the data includes multiple relations (e.g., cities mapped to average population), each relation in which d appears may be independently analyzed for meeting the matching requirement. S is linked to G when the matching requirement is met, for example, when the percentage of cities in which riots have occurred (as defined by S) appear in graph G according to the matching requirement, then the field city in S is linked to G, by creating a link between each city and respective average density value.

Optionally, when each field includes a set of values (or a set of objects each assigned a value), the matching requirement is based on members of the set of values (e.g., objects) in each field, such as one or more objects of one or more sets of the primary field being matched to secondary field(s). Optionally, S may correspond to the set of elements (or objects), for example, the set of medicines prescribed to a patient. In such a case, the matching requirement may define that for each d, at least one of its elements may be linked.

Optionally, the predefined matching requirement is based on utilization of available computational resources, such that the linked datasets may be processed using the available computational resources and/or within a reasonable time frame.

The predefined matching requirement may be related to a maximum number of links between the primary and secondary datasets. Setting a limit to the number of links may cap the resource requirements. The predefined matching requirement may be related to an estimated processing time for creating the enhanced training dataset (e.g., as in block 120) using a target processing unit and/or target memory. For example, a higher matching requirement (e.g., higher percentage) may have a lower probability of being met (i.e., as more values need to be matched together), resulting in fewer links, utilization of less resources, and/or computation in less time. For example, when the primary training dataset is a table includes n fields (e.g., columns) each containing a single object (e.g., a name of a city), and a secondary dataset is a table including m fields (e.g., columns), the number of possible matches (i, j), is of order $m^2$, yielding an order of $n*m^2$. When tables include tens of columns, the number of possible matches is in the hundred, or thousands of potential links. Adding all possible links adds a significant amount of irrelevant information, which tie-up computational resources, and in some cases, the computation of the method may not be possible using the target computational resources within a reasonable time.

Optionally, the amount of matching values are estimated, rather than absolutely computed. The estimated amount may be evaluated against the matching requirement. Optionally, the first set of values which is used to evaluate for a potential match in the secondary data source is extracted by sampling a subset of values of one or more fields from the primary training dataset. The sampling may be a logarithmic fraction (or a linear fraction, or selected by an absolute value, or selected dynamically, or using a function, and/or other portions) of the primary training dataset.

Alternatively or additionally, a set-representation of secondary field(s) is created and used to identify for matches with the first set of values from the primary training dataset. For example, a hash table, a bloom filter, and/or other representation of values of the secondary fields are created. The hash table and/or bloom filter is used to identify matches, for example, rather than using the secondary dataset itself.

Use of the set-representation may improve matching performance, such as by reducing processing resource requirements to identify the matches. The set-representation may be designed to match with a high probability (e.g., predefined probability) of the coverage estimate (e.g., by Hoeffding's inequality). The complexity of matching using the set-representation may be order $O(n*m*\log(p))$ where p is the number of entities in the primary training dataset.

It is noted that every (or subset of) field(s) of the primary training dataset may be analyzed for a match with every (or subsets of) secondary dataset(s). The matching analysis may be performed sequentially and/or iteratively (e.g., as described with reference to block 124) and/or simultaneously (e.g., using parallel processing methods).

At 110, the code (implementable by the processing unit) links the primary training dataset to the secondary datasets according to the identified matches.

Optionally, the respective matched values of the first set of values are linked to other secondary fields of the respective secondary data instance corresponding to the respective matched secondary field.

The linking may be performed by creating pointers that point between the matching values of the primary training dataset and the matching fields (or data instances) of the secondary datasets, for example, by a separate pointer table, and/or by adding a column to the primary training dataset. Alternatively or additionally, the linking is performed by copying the values of the matched fields of the secondary dataset(s) to newly created fields of the primary training dataset, by creating a new training dataset including the fields of the primary and secondary datasets, or by other methods.

In terms of mathematical representation, for secondary dataset represented as table T with identified matching field (i.e. column) Tj, a link to another column (i.e., field) of the instance corresponding to the matched field k may be defined as: $F(d \text{ in } S) = \{Tik \text{ such that the d corresponds to } Tij\}$.

For example, referring back to the example discussed with reference to block 108, when the primary training dataset (S) includes different fields related to employees, the secondary dataset (7) includes the fields (employee ID, department), and a match is identified between employee IDs (d), the primary dataset is linked (via its matching employee ID values) to the department (k) field of the secondary dataset.

Optionally, when the same (or similar according to a requirement) value (d) of the primary dataset appears in two or more data instances (e.g., in a table storing diseases and prescribed medications, two or more medications may be prescribed for the same disease), different options are available for the linking (e.g., according to decision rules which may be predefined and/or dynamically determined). The two or more data instances may be aggregated into a single data instance (e.g., by aggregating values in other fields into a set of values), which is then linked to the matched secondary dataset. The two or more data instances may each be linked independently. One or more of the data instances may be selected for linking (leaving the other data instances unlinked), for example, according to the values in the other fields, such as maximum values, average values, minimum values, or other factors.

For example, when two or more names (which are the same or similar) in an employee name field have been identified for matching, the two names may be assumed to be different people, in which case linking may be performed independently for each instance. In another example, when two or more salaries (which are the same or similar) in a salary field have been identified for matching, the other fields of the data instances may be aggregated, and the single salary in the resulting aggregated data instance is linked. In yet another example, when two or more positions (which are the same or similar) in a position field have been identified for matching, and another field includes salary, the following may be performed: create a new data instance in which the salary field includes an average of the values in the corresponding original data instances, select the data instance having the maximum value in the salary field, and select the data instance having the minimum value in the salary field. It is noted that similarity may be defined, for example, according to a similarity requirement, for example, for a number ±5% may be determined as similar.

It is noted that linking is performed based on the data structure representing the data instance. For example, when the data instance is represented as a graph G, F(d) may be defined as the set of edges that correspond to d in the graph, or alternatively the set of neighbor nodes, or alternatively one edge or node is picked according to a decision rule.

For example, for S including city names, a secondary source graph G may be identified as matching cities to geographic locations. In such a case, F(d) matches each city with each known location in G.

It is noted that identification of the match (block 108) and linking of the matches may be performed for a set of values and/or fields (e.g., instead of for individual values and/or fields), for example, identification and/or linking may be performed for a set of fields (e.g., columns) such as a first field storing first names and a second field storing family names, or a first field storing prescribed medications and a second field storing patient diagnosis. Alternatively or additionally, the two or more fields are aggregated into a single field, and matching and linking are performed on the single field.

It is noted that the same value of the primary dataset may be linked to one or multiple secondary datasets.

At 112, the code (implementable by the processing unit) generates a set of classification features based at least on the linked second set of secondary fields. The set of classification features at least include one or more functions that extract features from at least each one of the secondary fields. Features may be extracted from a combination of the primary fields and the linked secondary fields of the data instance.

Optionally, the classification features are designed to process objects of the secondary field of arbitrary type (i.e., types not necessarily known in advance), for example, news items, and vectors of blood test values. Alternatively, the classification features are designed to process objects of a predefined type.

The classification features may be binary classification features that extract a binary value from the linked secondary data fields which may be of arbitrary type.

The binary classification feature outputs one out of two possible values, for example, yes or no, 1 or 0. The binary classification feature may include mathematical condition(s) applied to value(s) (e.g., objects) of the linked secondary data fields of the other data instances (i.e., values of the non-matched secondary data instance), such as: greater than, less than, equal to, greater than or equal to, less than or equal to, and membership in a set containing the value. The mathematical conditions may compare between a new received value (e.g., extracted value) and the value(s) of the linked secondary data fields.

In terms of mathematical representation, let L denote the objects (or values) of one or more linked secondary fields, which may be represented as a vector (e.g., average salary in the department of the matched employee, set of three main ethnic groups in a city). L may be converted into a set of binary features as follows: if L contains numeric values (e.g., according to a requirement, such as over 50% or 80%), then for each value I in L, create the following features, for example: $Li <= I$, $Li == I$, and/or $L >= I$. In the case of L including groups of objects (e.g., according to a requirement), for example, groups of prescribed medications, then for each I in L a classification feature is created that outputs whether or not I is contained in Li.

It is noted that L may not be known in advance, such as when L is extracted from a newly received data instance. As such, each created classification feature may be designed to operate on newly received data (which may be extracted from the existing datasets or a new dataset), using the operation in relation to data from the matched secondary dataset. For example, a classification feature that outputs whether or not a newly received (e.g., extracted) population density is below a value I. For example, for a set of the three most common age groups in a city, a classification feature may return whether or not Li contains the value "below 10".

Alternatively or additionally, the classification features are generated using a base function (which may be a complex function comprised of multiple building block functions) is applied to the matched value(s) (e.g., objects) of the secondary fields and/or to a set of matched values to calculate a first set of results. The first results may include objects of arbitrary type. The classification features (set to process a new data instance) are generated by including the base function and condition(s) defined by respective member(s) of the set of first results applied to a second result created by the base function processing the new data instance. Additional details of generating such classification features are described with reference to U.S. Patent Application having Attorney Docket No. 62746.

Alternatively or additionally, other methods may be used to generate the classification features, for example, features may be manually entered, features may be retrieved from storage (e.g., predefined features), or created using other methods.

Optionally, each classification feature may be mathematically represented as: mix(func(o), dataPoint), where func is a function (as described herein), mix is the condition described herein, and dataPoint is selected using the results of func(o) on the training data. Examples of dataPoint include: one or more of the objects (or portion(s) thereof) returned by func(o), a member of the collection when func(o) returns a collection, and a key when func(o) returns a type which may be viewed as a map. Other mathematical representations may be used to represent other features described herein.

At 114, the code (implementable by the processing unit) applies each (or selected subset of) generated classification feature to the linked data. The generated classification features may be applied to the primary training dataset linked to one or more secondary dataset. The generated classification features may be applied to the linked secondary fields of the secondary datasets.

The applied classification features generate a set of extracted features, optionally as a feature vector or other representation.

At 116, the code (implementable by the processing unit) selects a subset of pivotal classification features from the set of classification features. Selection of the subset of pivotal classification features may be according to one or more correlation requirements between the classification label of the primary data instance corresponding to the value linked to the linked secondary field used in the respective classification feature, and the respective extracted feature(s) of the applied classification feature.

The correlation requirement may include a statistical significance value.

Correlation requirements may include, for example, a value above a correlation threshold, for example, on a scale of 0-1, a value of greater than 0.7, or 0.8, or 0.9, or other smaller, intermediate or larger values.

Alternatively or additionally, selection is based on other requirements (which may be defined as other correlation requirements), for example, computation time and/or computation resource requirements (e.g., memory, processor). For example, features which have low computation requirements below a threshold and/or low computation time below a threshold may be selected over other feature that do not meet the time and/or resource requirements. The computational resource requirement may be selected based on the target computer that may be performing the classification using the trained classifier, which may be the same or a different computing unit than the computer that generates the features and/or trains the classifier.

For example, the correlation requirement may include a predefined time threshold representing a maximal time to perform the classification on a Smartphone (or other mobile device) having standard processing capabilities. In another example, the correlation requirement may be based on a web server performing the classification by allocating limited resources to the classifier.

The correlation requirements may be provided by the user via the user interface, automatically generated by code (e.g., by mapping resources of the target computer), and/or based on estimated time and/or target resources (e.g., generated from a model and/or read from a file).

Feature selection may be performed, for example, using methods described with reference to with reference to related U.S. patent application Ser. No. 14/595,394, filed Jan. 13, 2015, title "FUNCTION STREAM BASED ANALYSIS", by some of the same inventors, the contents of which are incorporated herein by reference in their entirety, or other methods, for example, a statistical correlation evaluated using techniques such as Chi-Squared, Information gain, Pearson correlation and/or others evaluation techniques.

The set of statistically relevant pivotal classification features (optionally binary features) may be mathematically represented as F.

At 118, the code (implementable by the processing unit) identifies a corresponding subset of pivotal secondary fields based on the selected pivotal classification features. Each pivotal classification feature is designed for application to one or more secondary fields (as described herein). The set of secondary fields processed by the set of pivotal classification features may be identified as the subset of pivotal secondary fields. The set of secondary fields may be reconstructed from the pivotal classification features.

Optionally, when multiple pivotal classification features generated based on the same (or partially overlapping) secondary fields are identified as statistically relevant, duplicates of pivotal secondary fields may be removed (or not added).

Alternatively or additionally, when one pivotal classification feature is identified as statistically significant, corresponding classification features derived from the same secondary fields may not need to be tested for statistical significance.

For example, when the classification feature >=X has been found to be statistically significant, classification features such as <=X may not need to be tested.

It is noted that the pivotal secondary fields may include one or more columns, or a subset of columns (e.g., main age groups), such as when the secondary dataset is implemented as a table. The pivotal secondary fields may include nodes, relations, graphs (or subsets thereof) (e.g., population density).

At 120, the code (implementable by the processing unit) creates an enhanced training dataset by linking the subset of pivotal secondary fields to the primary training dataset. The values of the pivotal secondary fields may be added to the primary training dataset. The values of the pivotal secondary fields may be added to every data instance of the primary training dataset, for example, even when specific such links have not been identified. Alternatively, values of the pivotal secondary fields are added to corresponding linked data instances of the primary training dataset.

Enhanced training dataset 228 may be stored in storage unit 210. The enhanced training dataset 228 may be newly created data, or a table (or other representation) storing links between the primary dataset and the pivotal secondary fields, or stored as other representations.

In this manner, new fields (e.g., columns when data is represented as a table) that yielded statistically significant classification features are added to the primary training dataset. For example, when the prediction problem relates to prediction of riots, a new column "main age groups" may be added (as an entry to each row) when the value "below 10" has been identified as statistically significantly correlated with the prediction problem.

The systems and/or methods prevent or reduce the addition of statistically irrelevant data items (e.g., the name of the mayor of the city in the riot example), which may lead to improved computational performance, instead of, for example, adding all data items and processing the irrelevant data items, which may lead to computational unfeasible datasets.

At 122 the selected subset of pivotal features and/or enhanced training dataset are provided, optionally for use in an automated machine learning process. The pivotal features and/or enhanced training dataset may be documented by being stored in storage unit 210, on a data server, or other locations.

The pivotal classification features and/or enhanced training dataset may be stored as newly created data.

The pivotal classification features may be stored in pivotal classification feature repository 216. The enhanced training dataset may be stored in primary dataset repository 212.

At 124, the code (implementable by the processing unit) iterates the method (e.g., blocks 102-122). Iterations may be performed until a stop condition is met.

Each iteration may be performed by designating the enhanced training dataset as the primary training dataset (block 102). At block 104, links and/or files related to the added secondary data fields may be automatically followed by the crawling program and/or manually added by a user. It is noted that the same secondary datasets may be analyzed in another iteration, and/or new datasets may be analyzed (e.g., based on the added secondary fields of the previous round). Repeating the remaining blocks may add additional secondary fields to the enhanced training dataset. The subset pivotal classification features may be re-identified newly during each iteration round, and/or newly identified features added to the previously identified subset.

Stop conditions include, for example, a computational processing limit (e.g., processing time, processor utilization, and/or memory utilization), a number of iterations, a size of the enhanced dataset, a number of pivotal classification features, and/or other stop conditions (which may be statically and/or dynamically defined).

For example, in relation to the problem of predicting employee churn, a first iteration may identify adding a field of the employee's manager. A second iteration may identify a different table, and identify adding a field of the gender of the manager.

At 126, the selected subset of pivotal classification features may be used to generate a predictive and/or classification machine learning model. The subset of pivotal features may be used to train a statistical classifier.

Training may be performed using the enhanced training dataset 228 (or portions thereof), and/or other training data. The associated data classification labels of dataset 228 may be used as inputs of classification results. The subset of pivotal classification features is applied to the designated data instances to generate extracted features, optionally as feature vectors. The feature vectors along with labels of the data instances (or other clustering techniques) may be used to train the classifier.

Training may be performed based on supervised and/or unsupervised learning methods, for example, linear classifiers, support vector machines, and k-nearest neighbor. The classifier may be built with regression and/or classification algorithms.

Different metrics, for example Precision, F-measure, and area under Receiver operating characteristic (ROC) curve, may be used to evaluate the performance of each of the classifier(s), with the related features selected accordingly. The trained classifier may be stored on storage unit 210, on a server, and/or at other locations, for example, as code, as a script, or other suitable representations. The trained classifier may be provided to computing units to analyze new data instances.

At 128, the trained classifier may be applied to a new received data instance, to generate a classification and/or predictive value, optionally based on one or more of the data classification labels of the primary training dataset.

Pivotal classification features are extracted from the new data instance by applying the set of pivotal classification features (or a selected sub-set thereof, for example, depending on relevancy and/or availability of the data). The extracted pivotal classification features are provided as input to the trained classifier to perform the classification and/or prediction. The result may be displayed to the user on a display, stored on a memory, or provided to another process, for example, to code that analyzes the results.

It is noted that the systems and/or methods described herein may be implemented with the systems and/or methods described with reference to related U.S. patent application Ser. No. 14/595,394.

An example is now described with respect to the method of FIG. 1.

At 102, a primary training dataset including a tuple of the form (country, city, date, riot occurred) is designated. The prediction problem relates to predicting whether riots will occur give a date and a location. The field riot occurred is a historical classification outcome used as a label for training a statistical classifier.

At 104, a first secondary dataset represented as a table including a tuple of the form (city, population size, average income) is designated. A second secondary dataset (e.g., on a news web server) of news articles containing dates and text is designated. A third secondary dataset (e.g., on a public server) represented as a graph including cities as nodes with edges corresponding to ethnic groups, geographic locations, and other variables is designated.

At 106, the data may be pre-processed, for example, to represent all city names in lower case, and to remove spaces and commas from all numbers.

At 108, many of the date values in the date field of the primary training dataset are identified as matching dates in second secondary news sources. Many values in the city field of the primary training dataset are identified as matching city names in the first and third secondary datasets.

At 110, links are created between the matched values in the date field of the primary training dataset and news events having matching dates. Links are created between each matched city value in the city field of the primary training dataset and the other fields of the first and/or third datasets (i.e., population size, average income, ethnic group, geographical location).

At 112, classification features are generated from the linked dataset, as described herein.

At 114, the generated classification features are applied to the linked dataset, as described herein.

At 116, a subset of pivotal classification features is selected, as described herein. The pivotal classification features include statistical significant observations: that low income in a city is statistically significant with increasing the probability of a riot, that certain countries are statistically significant with increased risk of riot, and that a surge in the number of news articles is statistically significant with increased risk of riot.

At 118, pivotal secondary fields are identified, as described herein. The pivotal secondary fields include average income, and geographical location. It is noted that many of the secondary data fields appear to be irrelevant.

At 120, an enhanced training dataset is created, by linking the primary dataset with news events, and with corresponding fields of the secondary datasets, as described herein.

At 122, the pivotal features and/or enhanced dataset are documented.

At 124, one or more iterations are performed until a stopping criterion is met. A second iteration may add statistically relevant news topics to the enhanced dataset.

At 126, a statistical classifier that predicts riots is trained.

At 128, the statistical classifier is applied to predict a riot at a provided date and/or location.

Figure 3:
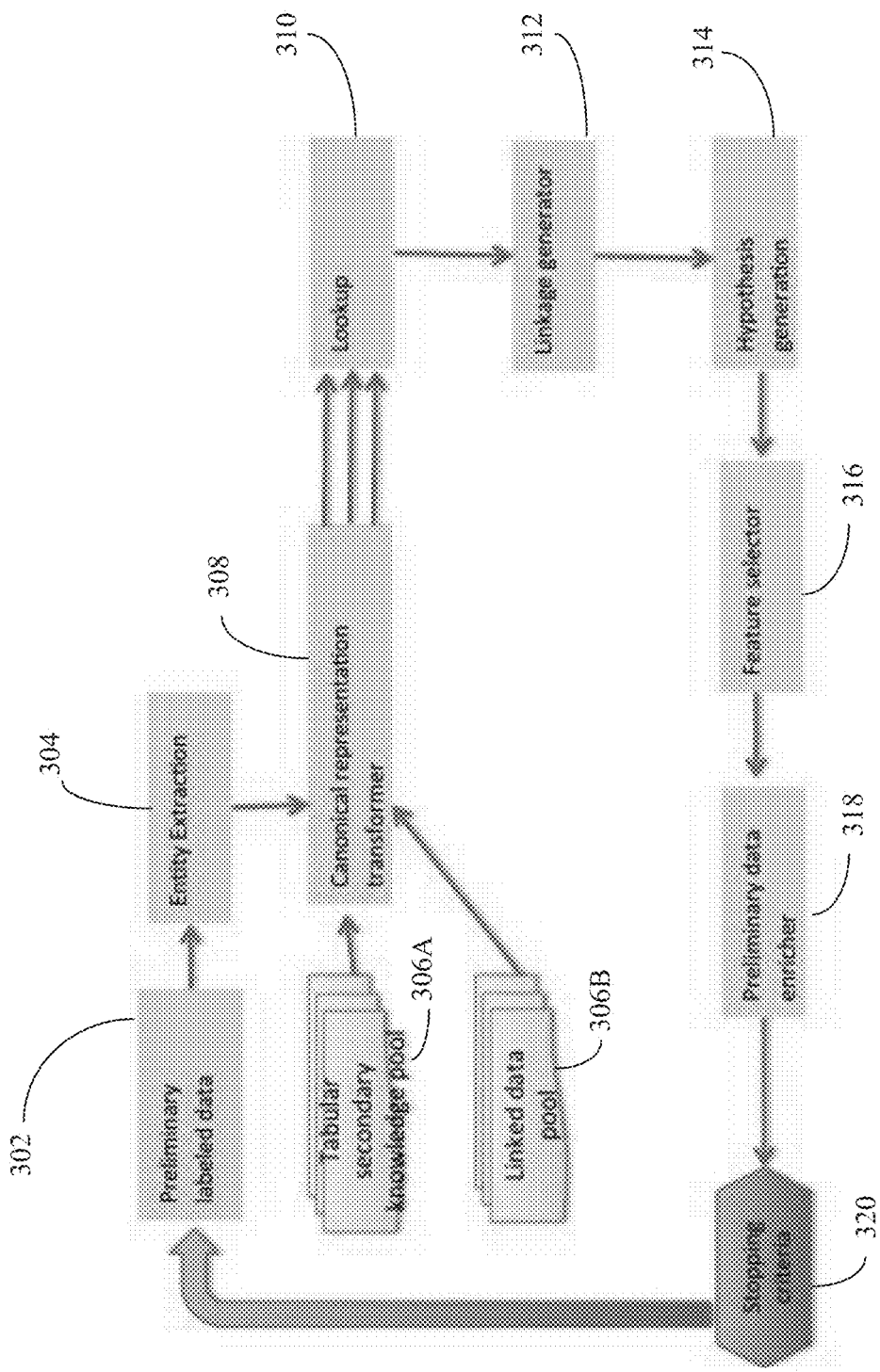
FIG. 3 is a dataflow diagram to automatically generate a set of classification features including features extracted from secondary data, for use in a machine learning method, in accordance with some embodiments of the present invention.

Reference is now made to FIG. 3, which is a dataflow diagram to automatically generate a set of classification features including features extracted from secondary data for use in a machine learning method, in accordance with some embodiments of the present invention. The dataflow of FIG. 3 may represent dataflow according to the method of FIG. 1, and/or dataflow within the system of FIG. 2.

At 302, preliminary labeled data (i.e., primary training dataset) is designated.

At 304, the preliminary labeled data is processed, to extract relevant entities.

At 306A-B, secondary datasets are designated. Secondary datasets include tabular secondary knowledge pool (i.e., organized in tables), and/or linked data pool (i.e., organized as graphs and/or other linked data representations).

At 308, the primary and/or secondary data are converted to canonical representation(s).

At 310, values in the primary dataset are looked-up in the secondary datasets, top identify matches.

At 312, links are generated between the primary and secondary datasets according to the identified matches.

At 314, classification features are generated. The classification features represent a hypothesis of a possible statistically significant correlation.

At 316, a subset of pivotal classification features is selected from the generated classification features according to a correlation requirement.

At 318, the preliminary labeled data is enriched, by linking secondary features (identified based on the pivotal classification features) of the secondary datasets to the preliminary labeled data.

At 320, the dataflow is iterated until a stopping criteria is met. The set of pivotal classification features derived from the preliminary labeled data enriched with secondary data may be used in an automated machine learning process, for example, for training a statistical classifier.

Figure 4A:
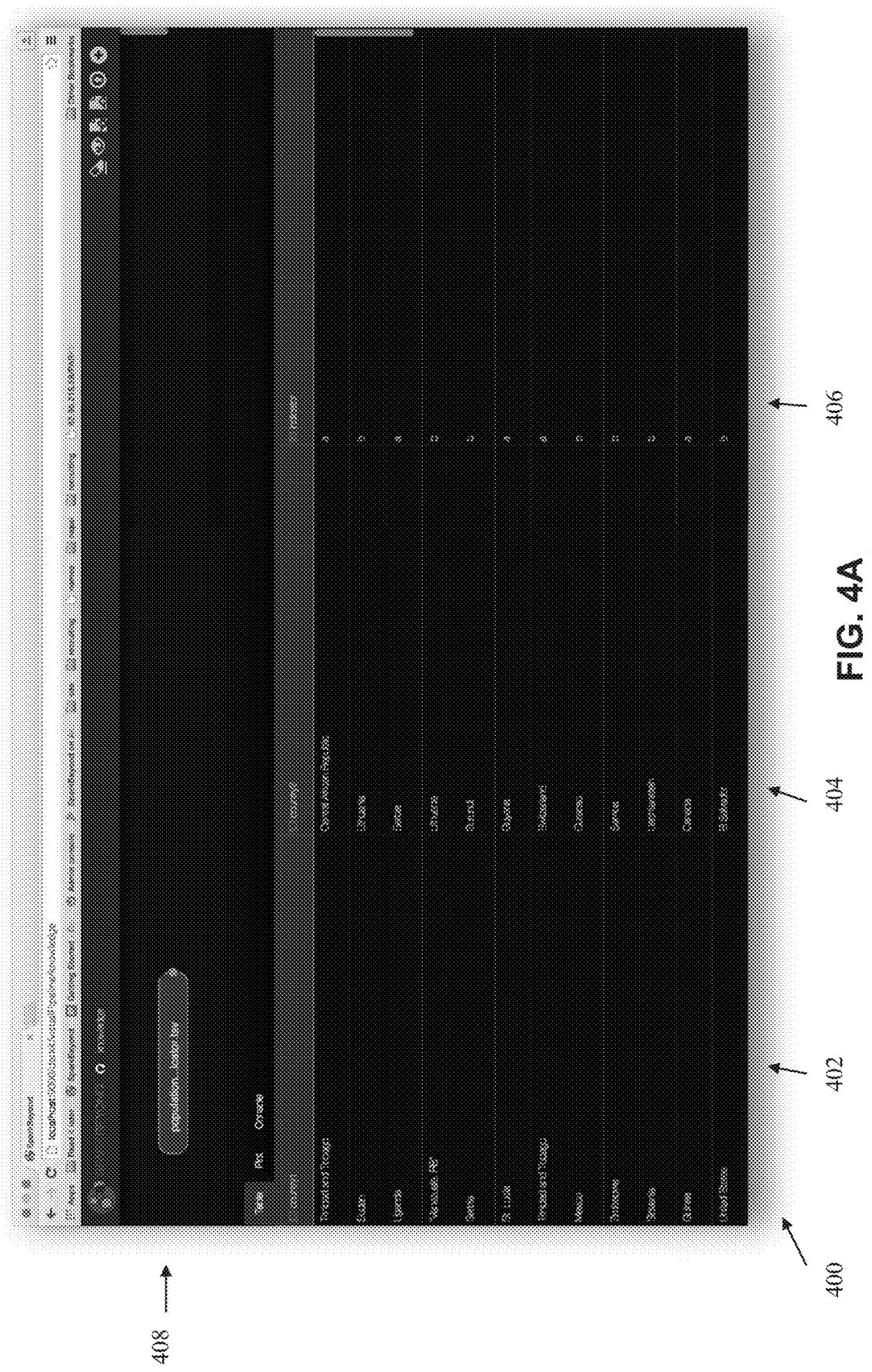
FIGS. 4A-4B are screenshots of an exemplary implementation of the method of FIG. 1 and/or system of FIG. 2 and/or dataflow of FIG. 3, in accordance with some embodiments of the present invention.
Figure 4B:

Reference is now made to FIGS. 4A-4B, which are screenshot of an exemplary implementation of the method of FIG. 1 and/or system of FIG. 2, in accordance with some embodiments of the present invention. The screenshots have been captured from a display (e.g. user interface 218). FIGS. 4A-4B depict a process of identifying a subset of pivotal classification features based on secondary data linked to primary data of countries and population density. The process receives the primary training dataset, and automatically identifies the pivotal classification features that are statistically correlated with classification labels of the primary training dataset using the secondary data sources.

FIG. 4A depicts a screenshot 400 of a primary training dataset (i.e. represented as a table) that includes a first primary data field 402 (i.e., column labeled country1) including countries as values, a second primary data field 404 (i.e., column labeled country2) including countries as values, and a classification label 406 (i.e., column labeled indicator) including the letters a or b as values. Each row in the table represents a data instance.

The classification label 406 represents the relative population density between the country of field 402 and the country of field 404. The indictor b denotes that the population density of the country of field 402 is not higher (i.e. lower) than the population density of the country of field 404. The indicator a denotes that the population density of the country of field 402 is higher than that of the country of field 404, or the population density for one or both of the countries is not known. The indicator may be externally calculated.

Dataflow 408 is an optional visual dataflow diagram that represents the stage in the process of generating the pivotal classification features represented by screen capture 400.

FIG. 4B is a screenshot depicting the automatically generated subset of pivotal classification features 450, which were generated from the primary training dataset of FIG. 4A. The pivotal classification features were selected based on linked secondary datasets, from which sets of classification features were extracted and analyzed for statistical relevancy with the classification label 406 of FIG. 4A. Secondary datasets include publicly available data available online (e.g., via the internet), for example, Wikipedia™, Open Street Map™, and Open Library™. The countries of the primary training dataset were linked to external data of the secondary datasets related to countries, for example, location, continent, capital city, leader name(s), currency, population, population density, gross domestic product (GDP), and the like.

Dataflow 452 is an update of dataflow 408 of FIG. 4A, representing the current screen capture.

The descriptions of the various embodiments of the present invention have been presented for purposes of illustration, but are not intended to be exhaustive or limited to the embodiments disclosed.

Many modifications and variations will be apparent to those of ordinary skill in the art without departing from the scope and spirit of the described embodiments.

The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant machine learning algorithms, and data representations will be developed and the scope of the terms classifier and dataset are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method of computing a classifier that classifies data with an extracted set of classification features based on secondary datasets, comprising:

identifying, for a first set of values of at least one primary field of a plurality of primary fields of a plurality of primary data instances of a primary training dataset each associated with a classification label, at least one second set of secondary fields of a plurality of unclassified second data instances of at least one secondary dataset, according to the first set of values matched to corresponding values in at least one respective secondary field according to a matching requirement;

linking each respective matched value of the first set of values, to other secondary fields of at least one respective secondary data instance of the respective matched secondary field, wherein the primary training dataset is selected from the group consisting of: a multi-column table and a matrix of primary cells, wherein each row represents a respective data instance and each column represents a respective primary field storing at least one value in each primary cell, wherein at least one member of the at least one secondary dataset is selected from the group consisting of: a table of secondary cells wherein each row represents a secondary data instance and each column represents a secondary field and a graph comprising linked data, wherein the linking is performed by creating pointers that point between each respective matched primary cell of the primary dataset and matched secondary cells of the at least one secondary dataset;

generating a set of classification features each including:
(i) at least one condition selected from a plurality of conditions,
(ii) a value selected from one of the cells or nodes storing the linked other secondary fields of the at least one respective secondary data instance of the respective matched secondary field,
wherein the respective classification feature outputs a binary value computed by the at least one condition that compares between the value selected from the other linked secondary fields and a new received data instance;

selecting a subset of classification features from the set of classification features according to a correlation requirement between the classification label of the primary data instance corresponding to the linked secondary cell used in the respective classification feature, and each respective classification feature;

identifying a subset of secondary cells based on the secondary cells associated with each selected subset classification feature; and computing a classifier for classification of a new received data instance according to the linked subset of secondary cells and the primary training dataset used for computation of the subset of classification features on the new received data instance for classification of the new received data instance.

2. The method of claim 1, further comprising iterating the method until a stop condition is met, by designating an enhanced training dataset based on the linked subset of secondary cells and primary dataset, and repeating the identifying the second set of secondary cells, linking, generating, selecting, identifying the subset of secondary cells, and the creating, using the designated enhanced training dataset.

3. The method of claim 1, wherein the matching requirement includes a percentage of the first set of values of the respective primary cell matching the corresponding values in the respective secondary dataset.

4. The method of claim 1, wherein the matching requirement comprises that the first set of values is selected by sampling a subset of values of the at least one primary cell.

5. The method of claim 1, further comprising preparing, for each secondary dataset, a set-representation of the plurality of secondary cells, and using the set-representation to match the first set of values and to identify the second set.

6. The method of claim 1, wherein at least one primary field includes a third set of data elements each assigned a value, and wherein identifying comprises identifying for the first set of values of a subset including at least one data element of the third set.

7. The method of claim 1, wherein the at least one condition is selected from the group consisting of: greater than, less than, equal to, greater than or equal to, less than or equal to, and containing the at least one value.

8. The method of claim 1, further comprising automatically designating at least one secondary dataset based at least one object type of at least one secondary cell that corresponds to at least one object type of the primary training dataset.

9. The method of claim 1, further comprising analyzing at least one primary data field to extract at least one entity according to at least one object type, and wherein identifying comprises identifying the second set of secondary cells according to the object type of the first set of values of the at least one extracted entity.

10. The method of claim 1, further comprising converting values in at least one of: the primary training dataset and the at least one secondary data set to a canonical representation, and performing the identifying based on the canonical representation.

11. The method of claim 1, further comprising training the classifier based on the selected subset of classification features applied to an enhanced training dataset created from the linking of the subset of secondary cells to the primary training dataset, and the associated data classification labels.

12. The method of claim 1, further comprising classifying the new data instance to at least one of the data classification labels, by applying each classification feature of the selected subset of classification features to the new data instance to extract a plurality of features and applying the classifier to the plurality of extracted features to output at least one of the data classification labels.

13. The method of claim 1, wherein the pointers are stored in a separate table that maps between the primary and second cells.

14. The method of claim 1, wherein the classifier classifies the new received data instance with increased accuracy in comparison to a classifier computed using the primary training dataset associated with classification labels without the linked unclassified secondary dataset.

15. A system for computing a classifier that classifies data with an extracted set of classification features based on secondary datasets, comprising:

a program store storing code; and
a hardware processor coupled to the program store for implementing the stored code, the code comprising:
code to identify, for a first set of values of at least one primary field of a plurality of primary fields of a plurality of primary data instances of a primary training dataset each associated with a classification label, at least one second set of secondary fields of a plurality of unclassified second data instances of at least one secondary dataset according to the first set of values matched to corresponding values in at least one respective secondary field according to a matching requirement, to link each respective matched value of the first set of values, to other secondary fields of at least one respective secondary data instance of the respective matched secondary field, wherein the primary training dataset is selected from the group consisting of: a multi-column table and a matrix of primary cells, wherein each row represents a respective data instance and each column represents a respective primary field storing at least one value in each primary cell, wherein at least one member of the at least one secondary dataset is selected from the group consisting of: a table of secondary cells wherein each row represents a secondary data instance and each column represents a secondary field and a graph comprising linked data, wherein the linking is performed by creating pointers that point between each respective matched primary cell of the primary dataset and matched secondary cells of the at least one secondary dataset, to generate a set of classification features each including: (i) at least one condition selected from a plurality of conditions, (ii) a value selected from one of the cells or nodes storing the linked other secondary fields of the at least one respective secondary data instance of the respective matched secondary field, wherein the respective classification feature outputs a binary value computed by the at least one condition that compares between the value selected from the other linked secondary fields and a new received data instance, to select a subset of classification features from the set of classification features according to a correlation requirement between the classification label of the primary data instance corresponding to the linked secondary cell used in the respective classification feature, and each respective classification feature, to identify a subset of secondary cells based on the secondary cells associated with each selected classification feature, and to compute a classifier for classification of a new received data instance according to the linked subset of secondary cells and the primary training dataset used for computation of the subset of classification features on the new received data instance for classification of the new received data instance.

16. The system of claim 15, further comprising a physical user interface coupled to the processor, the user interface set to allow a user to designate the primary training set and the at least one secondary dataset.

17. The system of claim 15, wherein at least one secondary dataset is a publicly accessible database residing on a remote server, accessible over a network.

18. The system of claim 15, wherein at least one secondary dataset is retrieved from content published by a website.

19. The system of claim 15, wherein the matching requirement is based a predefined number of links and the matching requirement is based on a predefined processing time for creating the enhanced training dataset using a target processing unit for processing the predefined number of links within the predefined processing time.

20. The system of claim 15, further comprising code that automatically crawls along at least one of links on a network and stored file in the at least one second storage unit, the code automatically designates the at least one secondary dataset according to at least one object type that corresponds to at least one object type of the primary training dataset.

21. A computer program product comprising a non-transitory computer readable storage medium storing program code thereon for implementation by a processor of a system for computing a classifier that classifies data with an extracted set of classification features based on secondary datasets, the program code comprising:
  instructions to identify, for a first set of values of at least one primary field of a plurality of primary fields of a plurality of primary data instances of a primary training dataset each associated with a classification label, at least one second set of secondary fields of a plurality of unclassified second data instances of at least one secondary dataset according to the first set of values matched to corresponding values in at least one respective secondary field according to a matching requirement;
  instructions to link each respective matched value of the first set of values, to other secondary fields of at least one respective secondary data instance of the respective matched secondary field, wherein the primary training dataset is selected from the group consisting of: a multi-column table and a matrix of primary cells, wherein each row represents a respective data instance and each column represents a respective primary field storing at least one value in each primary cell, wherein at least one member of the at least one secondary dataset is selected from the group consisting of: a table of secondary cells wherein each row represents a secondary data instance and each column represents a secondary field and a graph comprising linked data, wherein the linking is performed by creating pointers that point between each respective matched primary cell of the primary dataset and matched secondary cells of the at least one secondary dataset;
  instructions to generate a set of classification features each including:
    (i) at least one condition selected from a plurality of conditions,
    (ii) a value selected from one of the cells or nodes storing the linked other secondary fields of the at least one respective secondary data instance of the respective matched secondary field,
    wherein the respective classification feature outputs a binary value computed by the at least one condition that compares between the value selected from the other linked secondary fields and a new received data instance;
  instructions to select a subset of classification features from the set of classification features according to a correlation requirement between the classification label of the primary data instance corresponding to the linked secondary cell used in the respective classification feature, and each respective classification feature;
  instructions to identify a subset of secondary cells based on the secondary cells associated with each selected classification feature; and
  instructions to compute a classifier for classification of a new received data instance according to the linked subset of secondary cells and the primary training dataset used for computation of the subset of classification features on the new received data instance for classification of the new received data instance.

22. The method of claim 1, wherein the new received data instance is classified by the at least one of a predictive and a classification machine learning model subsequently to execution of the acts of the method.

23. The method of claim 1, wherein the types of the values of the first set of values of at least one primary field of the plurality of primary fields, and the types of the values of the second set of secondary fields of the at least one secondary datasets, are selected from the group consisting of: time series, vector, map, graph, and tree.

* * * * *